United States Patent
Suryanarayana et al.

(10) Patent No.: US 11,429,396 B1
(45) Date of Patent: Aug. 30, 2022

(54) VALIDATING AND ENUMERATING DEVICE PARTITIONS IN A COMPUTING ENVIRONMENT

(71) Applicant: Dell Products L.P., Round Rock, TX (US)

(72) Inventors: Shekar Babu Suryanarayana, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/324,296

(22) Filed: May 19, 2021

(51) Int. Cl.
*G06F 9/44* (2018.01)
*G06F 9/4401* (2018.01)
*G06F 21/57* (2013.01)

(52) U.S. Cl.
CPC ............ *G06F 9/4408* (2013.01); *G06F 9/441* (2013.01); *G06F 9/4411* (2013.01); *G06F 21/575* (2013.01)

(58) Field of Classification Search
CPC ...... G06F 9/4408; G06F 9/441; G06F 9/4411; G06F 21/575
See application file for complete search history.

(56) References Cited

U.S. PATENT DOCUMENTS

| | | | | |
|---|---|---|---|---|
| 2015/0220742 | A1* | 8/2015 | Ouyang | G06F 9/4406 713/189 |
| 2015/0256332 | A1* | 9/2015 | Raj | H04L 9/0877 713/150 |
| 2020/0074088 | A1* | 3/2020 | Fu | H04L 9/0825 |
| 2021/0026965 | A1* | 1/2021 | Suryanarayana | G06F 21/572 |

* cited by examiner

*Primary Examiner* — Zahid Choudhury
(74) *Attorney, Agent, or Firm* — Baker Botts, L.L.P.

(57) ABSTRACT

In one embodiment, a method for validating a partition of a device communicably coupled to an information handling system includes: determining platform attributes associated with the information handling system; identifying a platform key associated with the information handling system; generating a trusted platform key for the information handling system based on the platform attributes and the platform key; determining partition attributes associated with the partition of the device; generating a storage root key for the partition of the device based on the partition attributes and the trusted platform key; generating a trusted boot signature for the partition of the device based on the trusted platform key and the storage root key; and storing the trusted boot signature in the partition of the device to validate the partition.

20 Claims, 3 Drawing Sheets

VALIDATING AND ENUMERATING DEVICE PARTITIONS IN A COMPUTING ENVIRONMENT

BACKGROUND

Field of the Disclosure

The disclosure relates generally to information handling systems, and in particular to validating and enumerating device partitions in a computing environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a method for validating a partition of a device communicably coupled to an information handling system in a computing environment includes: determining, by a management backend of the computing environment, platform attributes associated with the information handling system; identifying, by the management backend, a platform key associated with the information handling system; generating, by the management backend, a trusted platform key for the information handling system based on the platform attributes and the platform key; determining, by the management backend, partition attributes associated with the partition of the device; generating, by the management backend, a storage root key for the partition of the device based on the partition attributes and the trusted platform key; generating, by the management backend, a trusted boot signature for the partition of the device based on the trusted platform key and the storage root key; and storing, by the management backend, the trusted boot signature in the partition of the device to validate the partition.

In one or more of the disclosed embodiments, the method further includes: during a booting phase of the information handling system: accessing, by a trusted boot engine of the information handling system, a device path stored in a memory of the information handling system, the device path associated with a plurality of devices in the computing environment, each of the plurality of devices including one or more partitions, each of the one or more partitions storing an operating system; identifying, by the trusted boot engine, the partition of the device communicably coupled to the information handling system based on the partition identifier; identifying, by the trusted boot engine, the trusted boot signature stored in the partition; decoding, by the trusted boot engine, the device path to generate a list of devices enumerating each of the plurality of devices in the computing environment; and adding, by the trusted boot engine, the device communicably coupled to the information handling system to the list of devices.

In one or more of the disclosed embodiments, the method further includes: identifying, by the trusted boot engine, an additional device communicably coupled to the information handling system, the additional device including an additional partition; identifying, by the trusted boot engine, that the additional partition does not include an additional trusted boot signature stored in the additional partition; and excluding, by the trusted boot engine, the additional device communicably coupled to the information handling system from the list of devices.

In one or more of the disclosed embodiments, the method further includes: electronically presenting, by the trusted boot engine, the list of devices to a user of the information handling system via a display of the information handling system; receiving, by the trusted boot engine, a selection from the user indicating a selected operating system stored in a selected partition of a selected device of the plurality of devices enumerated in the list of devices; and causing, by the trusted boot engine, a boot loader stored in the selected partition of the selected device to boot the selected operating system stored in the selected partition for the user.

In one or more of the disclosed embodiments, each operating system stored in the one or more partitions of each of the plurality of devices is associated with a priority, the priority based on a boot history associated with the operating system.

In one or more of the disclosed embodiments, determining the platform attributes associated with the information handling system includes: identifying, by the management backend, a model type associated with the information handling system; and identifying, by the management backend, a manufacturer associated with the information handling system.

In one or more of the disclosed embodiments, determining the partition attributes associated with the partition of the device includes: generating, by a trusted boot engine of the information handling system, a partition identifier for the partition of the device; storing, by the trusted boot engine, the partition identifier in a memory of the information handling system; accessing, by the management backend, the partition identifier in the memory of the information handling system; identifying, by the management backend, an operating system type based on the partition identifier, the operating system stored in the partition of the device; and identifying, by the management backend, a boot loader type based on the partition identifier, the boot loader stored in the partition of the device.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
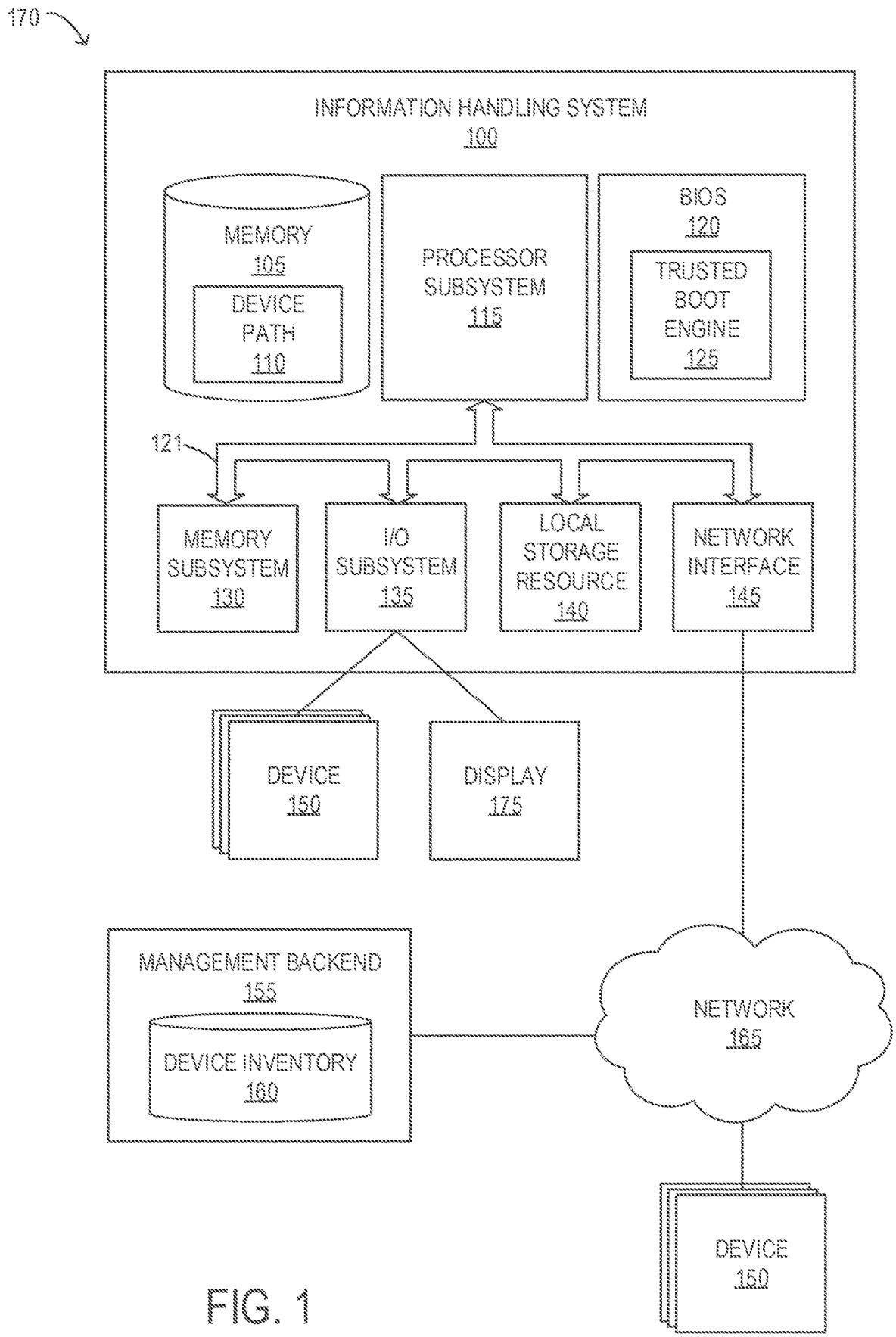
FIG. 1 is a block diagram of selected elements of an embodiment of a computing environment that includes an information handling system and a management backend.

This document describes a method for validating a partition of a device communicably coupled to an information handling system in a computing environment that includes: determining, by a management backend of the computing environment, platform attributes associated with the information handling system; identifying, by the management backend, a platform key associated with the information handling system; generating, by the management backend, a trusted platform key for the information handling system based on the platform attributes and the platform key; determining, by the management backend, partition attributes associated with the partition of the device; generating, by the management backend, a storage root key for the partition of the device based on the partition attributes and the trusted platform key; generating, by the management backend, a trusted boot signature for the partition of the device based on the trusted platform key and the storage root key; and storing, by the management backend, the trusted boot signature in the partition of the device to validate the partition.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
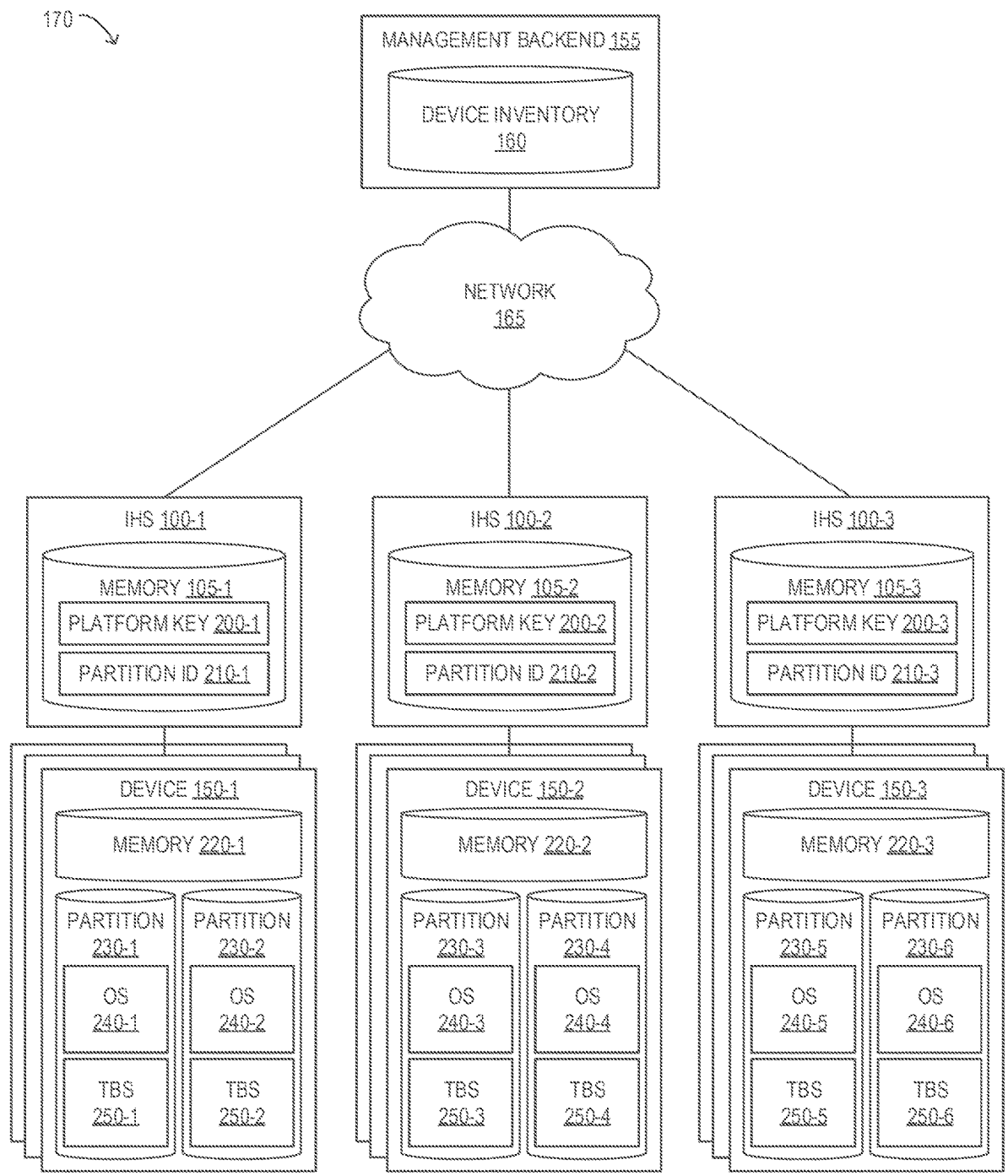
FIG. 2 is a block diagram of selected elements of an embodiment of a computing environment that includes multiple information handling systems and a management backend.
Figure 3:
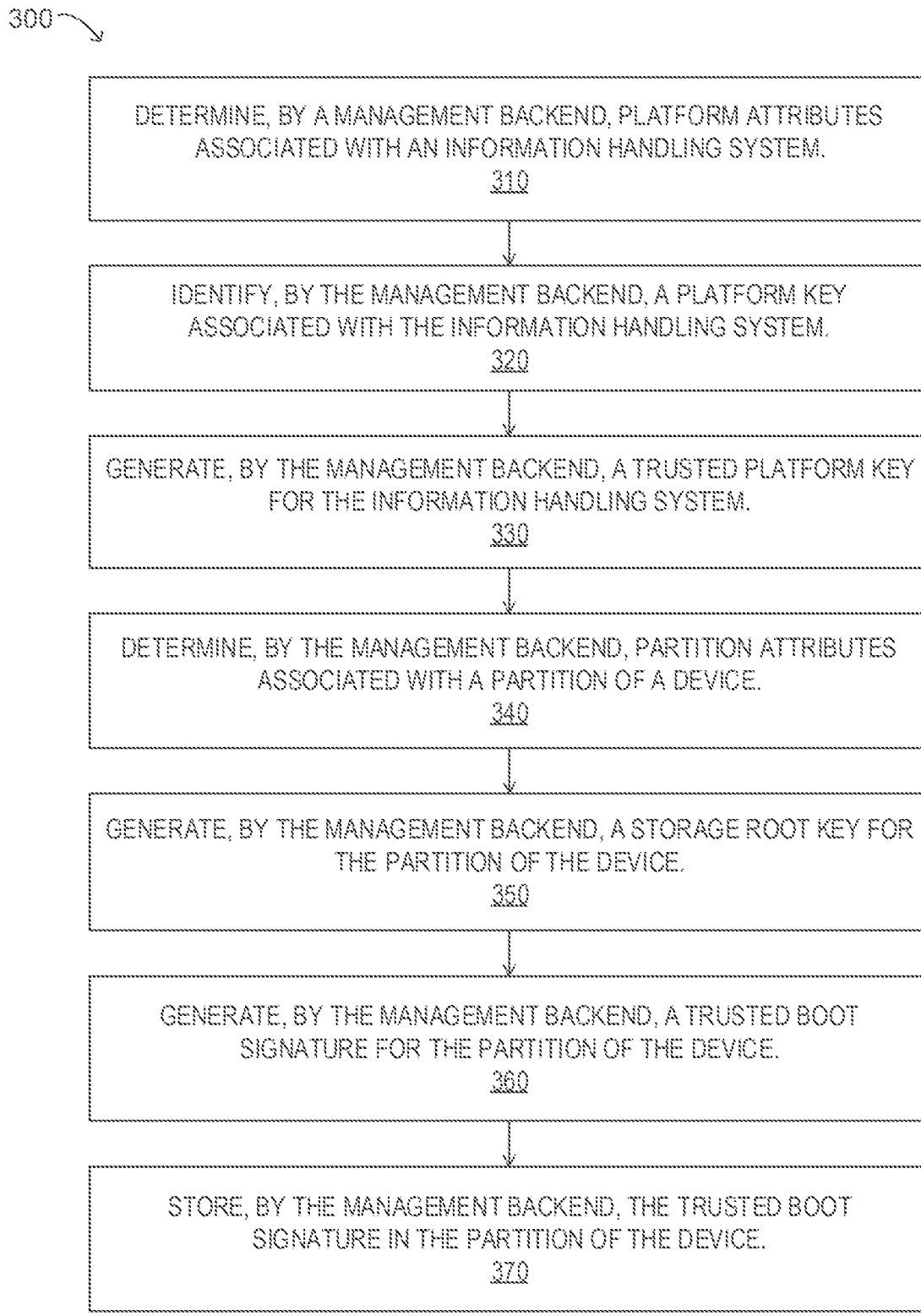
FIG. 3 is a flowchart depicting selected elements of an embodiment of a method for validating a partition of a device communicably coupled to an information handling system in a computing environment.

Particular embodiments are best understood by reference to FIGS. 1-3 wherein like numbers are used to indicate like and corresponding parts.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 115, which may comprise one or more processors, and system bus 121 that communicatively couples various system components to processor subsystem 115 including, for example, a memory subsystem 130, an I/O subsystem 135 communicably coupled to one or more devices 150 and a display 175, a local storage resource 140, and a network interface 145. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. As shown in FIG. 1, information handling system 100 may additionally include a memory 105 that includes a device path 110 and a basic input/output system (BIOS) 120 that includes a trusted boot engine 125. In other embodiments, computing environment 170 may include additional, fewer, and/or different components than the components shown in FIG. 1.

In information handling system 100, processor subsystem 115 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 115 may interpret and/or execute program instructions and/or process data stored locally (e.g., in memory subsystem 130 and/or another component of information handling system 100). In the same or alternative embodiments, processor subsystem 115 may interpret and/or execute program instructions and/or process data stored remotely. In one embodiment, processor subsystem 115 may be or include a multi-core processor comprised of one or more processing cores disposed upon an integrated circuit (IC) chip. In other embodiments, processor subsystem 115 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 135 may comprise a system, device, or apparatus generally operable to receive and/or transmit data to, from, and/or within information handling system 100. I/O subsystem 135 may represent, for example, a variety of communication interfaces, graphics interfaces, video interfaces, user input interfaces, and/or peripheral interfaces. In various embodiments, I/O subsystem 135 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 140 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 145 may be a suitable system, apparatus, or device operable to serve as an interface between information handling system 100 and a network 190. Network interface 145 may enable information handling system 100 to communicate over network 190 using a suitable transmission protocol and/or standard, including, but not limited to, transmission protocols and/or standards enumerated below with respect to the discussion of network 190. Network 190 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 145 may enable wired and/or wireless communications (e.g., NFC or Bluetooth) to and/or from information handling system 100.

In particular embodiments, network 190 may include one or more routers for routing data between client information handling systems 100 and server information handling systems 100. A device (e.g., a client information handling system 100 or a server information handling system 100) on network 190 may be addressed by a corresponding network address including, for example, an Internet protocol (IP) address, an Internet name, a Windows Internet name service (WINS) name, a domain name or other system name. In particular embodiments, network 190 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 190 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 190 and its various components may be implemented using hardware, software, or any combination thereof.

In one embodiment, memory 105 may comprise a system, device, or apparatus operable to retain and/or retrieve program instructions and/or data for a period of time (e.g., computer-readable media). Memory 105 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. In the embodiment illustrated in FIG. 1, memory 105 may include device path 110.

In one embodiment, BIOS 120 may be a suitable system, apparatus, or device operable to manage resources for information handling system 100. In particular, BIOS 120 may be or include a set of firmware instructions electronically stored within information handling system 100 that allows information handling system 100 to manage various resources and/or perform specific tasks. For example, information handling system 100 may use BIOS 120 to perform hardware initialization during a pre-boot sequence and/or to provide runtime services for other host services executing on information handling system 100. In the embodiment illustrated in FIG. 1, BIOS 120 may include trusted boot engine 125.

In one embodiment, each device 150 (collectively referred to herein as "devices 150") may be a suitable system, device, or apparatus generally operable to store one or more operating systems. Specifically, devices 150 disposed throughout computing environment 170 may each include one or more partitions used to respectively store an operating system. In one embodiment, the one or more partitions of each device 150 deployed throughout computing environment 170, and the operating systems therein, may be made available to a user of information handling system 100 (e.g., via network 165) such that the user may select an operating system for use. For example, information handling system 100 may electronically present a list of devices within computing environment 170 to a user via display 175 such that the user may select a device 150 within the list of devices and may select a partition within the device 150 storing a preferred operating system. In the embodiments illustrated in FIGS. 1 and 2, devices 150 may be available via network 165, communicably coupled to information handling system 100, and/or communicably coupled to information handling systems (e.g., information handling systems 100-1 through 100-3 shown in FIG. 2).

In information handling system 100, display 175 may comprise a system, device, or apparatus generally operable to display information processed by information handling system 100. In particular, display 175 may be or include an output device of information handling system 100 comprised of circuitry configured to display information to a user, a casing to house the circuitry, and a power supply. In one embodiment, display 175 may be or include an Organic Light-Emitting Diode (OLED) monitor. In other embodiments, display 175 may be or include an LED display, a Liquid Crystal Display (LCD) monitor, a plasma screen monitor, and/or any other type of monitor suitable for displaying information processed by information handling system 100.

In computing environment 170, management backend 155 may be a suitable system, apparatus, or device operable to provide an interface through which a user may communicate with information handling system 100. Specifically, management backend 155 may be or include an information handling system communicably coupled to information handling system 100 via network 165 such that a user (e.g., an administrator) of management backend 155 may remotely access and monitor physical parameters of information handling system 100 (e.g., power supply voltage, fan speed, humidity, ambient temperature, and the like). In one embodiment, management backend 155 may access one or more devices, buses, and/or portions of information handling system 100. In particular, management backend 155 may access one or more devices, buses, and/or portions of information handling system 100 via network 165 to perform a management information exchange with information handling system 100. In one embodiment, the management information exchange may be based at least on an Intelligent Platform Management Interface (IPMI) standard. For example, management backend 155 may permit utilization of IPMI out-of-band interfaces such as IPMI Over LAN (local area network). In another example, the management information exchange may be based on a Redfish standard. In one embodiment, management backend 155 may be communicably coupled to one or more information handling systems (e.g., information handling systems 100-1 through 100-3 shown in FIG. 2) such that management backend 155 may validate one or more partitions within a device 150, or devices 150, communicably coupled to each information handling system during a validation process. In the embodiment illustrated in FIG. 1, management backend 155 includes a device inventory 160. Management backend 155 is described in further detail with respect to FIG. 2.

In one embodiment, device inventory 160 may be a suitable system, apparatus, or device operable to store information describing one or more devices 150 within computing environment 170. In particular, device inventory 160 may be or include a repository used to store information describing various properties (e.g., device name, device type, number of partitions, operating system type stored in each partition, boot loader type stored in each partition, device location, and the like) of devices 150, both, communicably coupled to information handling system 100 and available to information handling system 100, or information handling systems (e.g., information handling systems 100-1 through 100-3 shown in FIG. 2), via network 165. Each device 150 described in device inventory 160 may be enumerated within a list of devices electronically presented to a user of information handling system 100 (e.g., via display 175). For example, information describing one or more devices 150 stored in device inventory 160 may be used to generate a list of devices accessible to a user of information handling system 100. The list of devices may be electronically presented to the user such that the user may select a device 150 from the list of devices that includes a partition storing an operating system preferred by the user. In one embodiment, device inventory 160 may be or include a relational database in which device 150 descriptions and properties associated with the partitions therein are stored as entries within a list. In other embodiments, device inventory 160 may be or include a centralized database, distributed database, commercial database, operational database, and/or any other database management system suitable for storing information describing one or more devices 150 within computing environment 170. Device inventory 160 is described in further detail with respect to FIG. 2.

In one embodiment, trusted boot engine 125 may be a suitable system, apparatus, or device operable to enumerate one or more devices 150 for a user of information handling system 100. In particular, trusted boot engine 125 may be or include a set of firmware instructions electronically stored within information handling system 100 that allows information handling system 100 to access operating systems stored in respective partitions of devices 150 deployed throughout computing environment 170. For example, a device 150 may be communicably coupled to information handling system 100 as a result of disk swapping, or disk movement, in which a user physically decouples the device 150 from one information handling system and physically couples the device 150 to information handling system 100 (i.e., as shown in FIG. 1). In another example, a device 150 may be communicably coupled to network 165 as a result of disk swapping, or disk movement, in which a user physically couples the device 150 to network 165 (i.e., as shown in FIG. 1) such that the device 150 is accessible to information handling system 100 via network 165. In the examples described above, trusted boot engine 125 may first identify whether partitions within the device 150 include a validation, or a "trusted boot signature," stored within respective partitions of the device 150 and, upon identifying the trusted boot signatures, may add the device 150 to a list of devices electronically presented to the user. Conversely, if respective partitions within the device 150 do not include a trusted boot signature, trusted boot engine 125 may exclude the device 150, and/or the partitions that do not include the trusted boot signature, from the list of devices.

Conventionally, a user of an information handling system may be required to perform an initial boot, or boots, of an operating system stored within a partition of a device before the operating system is shown to be available to the user. For example, a user may be required to perform an initial boot of an operating system (i.e., using a boot manager associated with the operating system) before the boot manager, device, and/or operating system are/is enumerated within a list of available boot managers, devices, and/or operating systems that may be electronically presented to the user. That is, a user may typically be required to boot an operating system at least once for the boot manager, device, and/or operating system to be electronically presented to the user within a list of available boot managers, devices, and/or operating systems for user selection. However, this requirement may prove cumbersome to users in that a computing environment 170 that includes hundreds of operating systems stored within respective partitions of devices 150 deployed throughout the computing environment 170 may require users to perform an initial boot, or boots, of each operating system before the boot manager, device, and/or operating system are/is shown to be available to the users, thereby decreasing efficiency and diminishing overall user experience.

In contrast, trusted boot engine 125 may be or include a set of firmware instructions operable to generate a list of devices enumerating each device 150, and the partitions therein, deployed throughout computing environment 170 without requiring the user to perform an initial boot, or boots, of the operating system stored within respective partitions of each device 150. Specifically, trusted boot engine 125 may comprise a portion of BIOS 120 stored in information handling system 100 operable to generate a list of devices for a user during a booting process of information handling system 100. For example, trusted boot engine 125 may execute during one or more phases of a booting process within a pre-OS environment such that devices 150, and the partitions therein, accessible via device inventory 160 may be electronically presented to a user of information handling system 100 after the booting process is complete. That is, a user may access an operating system included within a list of devices electronically presented to the user via display 175 such that the user may boot the operating system without first performing an initial boot, thereby increasing efficiency and overall user experience.

In one embodiment, trusted boot engine 125 may access device path 110 stored in memory 105 of information handling system 100. In particular, trusted boot engine 125 may access device path 110 during a booting process of information handling system 100 to identify a device path to device inventory 160. In one embodiment, device path 110 may be stored in memory 105 in an encoded format for enhanced network security within computing environment 170. Trusted boot engine 125 may access device path 110 during a Pre Extensible Firmware Interface (EFI) Initialization (PEI) phase of the booting process. For example, trusted boot engine 125 may read device path 110 from memory 105 during the PEI phase of the booting process. In one embodiment, trusted boot engine 125 may assemble a hand-off block (HOB) that includes an index to device path 110 to be passed to subsequent phases of the booting process.

In one embodiment, trusted boot engine 125 may identify partitions of a device 150, or devices 150, communicably coupled to information handling system 100. Specifically, trusted boot engine 125 may load various drivers (e.g., network driver, USB driver, I/O hard drive driver, and the like) during a Driver Execution Environment (DXE) phase of the booting process. During the DXE phase, trusted boot engine 125 may generate a unique identifier, or a "partition identifier," for each partition of a device 150, or devices 150, communicably coupled to information handling system 100. Examples of partition identifiers may include a globally unique identifier (GUID), a universally unique identifier (UUID), and/or any other pseudo-random number suitable for identifying partitions of devices 150. Trusted boot engine 125 may use the partition identifiers associated with respective partitions to identify each partition. In one embodiment, trusted boot engine 125 may include the partition identifiers generated for respective partitions in the HOB to be passed to subsequent phases of the booting process.

In one embodiment, trusted boot engine 125 may identify trusted boot signatures stored in respective partitions of a device 150, or devices 150, communicably coupled to information handling system 100. In particular, trusted boot engine 125 may identify each partition of a device 150, or devices 150, communicably coupled to information handling system 100 indicated in the HOB (e.g., using the partition identifiers) during a Boot Device Selection (BDS) phase of the booting process. During the BDS phase, trusted boot engine 125 may identify whether respective partitions within the device 150, or devices 150, communicably coupled to information handling system 100 include a trusted boot signature indicating that the partition has been validated.

In one embodiment, trusted boot engine 125 may process the HOB during the BDS phase. Specifically, trusted boot engine 125 may identify the index to device path 110 included in the HOB and may decode device path 110 accordingly. As described above, device path 110 may be stored in memory 105 in an encoded format for enhanced network security within computing environment 170. Trusted boot engine 125 may decode device path 110 during the BDS phase of the booting process to generate a list of devices deployed throughout computing environment 170. Here, trusted boot engine 125 may add one or more devices 150 communicably coupled to information handling system 100 to the list of devices. In particular, trusted boot engine 125 may identify respective partitions within the one or more devices 150 communicably coupled to information handling system 100 that include a trusted boot signature and may add the one or more devices 150 to the list of devices. In contrast, if respective partitions within the device 150 do not include a trusted boot signature, trusted boot engine 125 may exclude the device 150, and/or the partitions that do not include the trusted boot signature, from the list of devices. In this way, only devices 150 having partitions that have been validated (i.e., storing a trusted boot signature) may be electronically presented to the user for selection, thereby further enhancing network security within computing environment 170.

In one embodiment, trusted boot engine 125 may electronically present the list of devices to a user of information handling system 100. In particular, trusted boot engine 125 may electronically present the list of devices to a user via display 175 of information handling system 100 (e.g., within a user interface electronically presented within display 175). In response to electronically presenting the list of devices indicating each device 150 that includes respective partitions storing a trusted boot signature, the user may select an operating system within a respective partition for use. That is, trusted boot engine 125 may receive a selection from a user indicating a selected operating system stored in a selected partition of a selected device 150 within computing environment 170 that has been enumerated within the list of devices. Once the selection from the user has been received, trusted boot engine 125 may cause a boot loader stored in the selected partition of the selected device 150 to boot the selected operating system for the user accordingly.

In one embodiment, trusted boot engine 125 may assign a priority to each operating system booted for a user. Specifically, trusted boot engine 125 may access a boot history associated with each operating system and may assign a priority to each operating system based on the boot history. In one embodiment, the boot history associated with each operating system stored in partitions within devices 150 communicably coupled to information handling system 100 may be stored in a memory 105 of information handling system 100. In another embodiment, the boot history associated an operating system stored in a partition within device 150 may be stored in a memory of device 150 (e.g., memory 220 shown in FIG. 2). In yet another embodiment, the boot history associated with an operating system may be stored in, both, memory 105 of information handling system 100 and a memory of device 150.

Upon accessing the boot history associated with respective operating systems, trusted boot engine 125 may identify one or more operating systems within the boot history having the most frequent instances of being selected and booted by a user. Trusted boot engine 125 may assign these one or more operating systems a highest priority (e.g., a priority of "1"), thereby indicating that the likelihood of the one or more operating systems being selected by the user again is relatively high with respect to the remaining operating systems included in the boot history. In addition, trusted boot engine 125 may identify one or more operating systems within the boot history having the least frequent instances of being selected and booted by the user. Trusted boot engine 125 may assign these one or more operating systems a lowest priority (e.g., a priority of "0"), thereby indicating that the likelihood of the one or more operating systems being selected by the user again is relatively low with respect to the remaining operating systems. In one embodiment, trusted boot engine 125 may enumerate each device 150 included in the list of devices based on priority. That is, the list of devices may be ranked such that devices 150 having a highest priority may be enumerated within the list of devices before, or above, devices 150 having a lowest priority, thereby simplifying selection for the user. In one embodiment, the user may manually assign priority to one or more operating systems within the boot history such that trusted boot engine 125 may enumerate each device 150 included in the list of devices based on the priority assigned by the user.

In one embodiment, a user and/or administrator of computing environment 170 may add one or more additional devices 150 to the list of devices electronically presented to the user via display 175. Specifically, a user and/or administrator of computing environment 170 may communicably couple one or more additional devices 150 to information handling system 100 and may access BIOS 120 stored in information handling system 100 to create one or more virtual disks representing the one or more additional devices 150. For example, the user and/or administrator of computing environment 170 may access a "Create New VD" screen in BIOS 120 via display 175 and may select an "Add VD in Disk Group" option to add the one or more devices 150 to the list of devices accordingly. Here, trusted boot engine 125 may generate partition identifiers for each partition within the one or more additional devices 150 and may send the partition identifiers to management backend 155 via network 165. Using the partition identifiers received from trusted boot engine 125, management backend 155 may identify various attributes associated with the partitions within the one or more additional devices 150 to generate trusted boot signatures for each partition. Once generated, management backend 155 may store the trusted boot signatures in the partitions to validate the partitions. Upon identifying that the partitions have been validated by management backend 155 (i.e., as indicated by the trusted boot signatures stored therein), trusted boot engine 125 may add the one or more additional devices 150 communicably coupled to information handling system 100 to the list of devices.

FIG. 2 is a block diagram of selected elements of an embodiment of a computing environment that includes multiple information handling systems and a management backend. In the embodiment illustrated in FIG. 2, computing environment 170 includes management backend 155, information handling systems 100-1 through 100-3 (collectively referred to herein as "information handling systems 100"), and devices 150-1 through 150-3 (collectively referred to herein as "devices 150") that include partitions 230-1 through 230-6 (collectively referred to herein as "partitions 230"). Information handling systems 100-1 through 100-3 may each be similar to information handling system 100 described above with respect to FIG. 1. Devices 150-1 through 150-3 may each be similar to device 150 described above with respect to FIG. 1. As shown in FIG. 2, information handling systems 100-1 through 100-3 may each be communicably coupled to management backend 155 via network 165 and may each be communicably coupled to one or more devices 150.

In one embodiment, management backend 155 may be or include a server (e.g., a signing server) operable to generate trusted boot signatures for partitions 230 of devices 150. For example, management backend 155 may generate trusted boot signatures for partitions 230 as part of a factory process within an original equipment manufacturer (OEM) prior to information handling systems 100 and devices 150 being distributed to companies and/or deployed throughout business enterprises. Once the trusted boot signatures are generated, management backend 155 may store a trusted boot signature within each partition 230 of each device 150 to validate the partition 230. In this way, trusted boot engine 125 may identify trusted boot signatures stored in partitions 230 of devices 150 communicably coupled to information handling system 100 during a booting process as described above with respect to FIG. 1. This allows devices 150 to be easily swapped, or communicably coupled to a series of different information handling systems 100 and/or networks, throughout computing environment 170 without requiring a user to perform an initial boot of each operating system before the boot manager, device 150, and/or operating system are/is electronically presented to the user within the list of devices.

To generate a trusted boot signature for a partition of a device 150 communicably coupled to an information handling system 100, management backend 155 may determine one or more characteristics, or "platform attributes," associated with each information handling system 100 in computing environment 170 as part of a platform validation process. For example, management backend 155 may identify platform attributes such as a model type and/or manufacturer associated with information handling systems 100 to ensure that each information handling system 100 is in accordance with proprietary credentials. In one embodiment, management backend 155 may access each information handling system 100 via network 165 to identify the platform attributes. In another embodiment, each information handling system 100 may send the platform attributes to management backend 155 via network 165.

In one embodiment, management backend 155 may identify a platform key 200 associated with each information handling system 100. In the embodiment illustrated in FIG. 2, each information handling system 100-1 through 100-3 includes a memory 105-1 through 105-3 that stores a platform key 200-1 through 200-3, respectively. In one embodiment, each platform key 200 may be or include a string of characters (e.g., numbers and/or letters) used, in part, by management backend 155 for validating information handling systems 100. In one embodiment, each platform key 200 may be stored in memory 105 as part of a factory process (e.g., within an OEM) prior to information handling systems 100 being distributed to companies and/or deployed throughout business enterprises. In another embodiment, platform keys 200 may be generated by management backend 155 for one or more information handling systems 100 deployed throughout computing environment 170 in response to a request from a user and/or administrator of computing environment 170.

In one embodiment, management backend 155 may generate a trusted platform key for each information handling system 100 based on the platform attributes and the platform key 200. In particular, management backend 155 may generate a trusted platform key for each information handling system 100 having platform attributes in accordance with proprietary credentials (i.e., an expected model type and/or manufacturer) and a platform key 200. In one embodiment, management backend 155 may generate a platform signing key during the platform validation process and may inject the platform signing key to generate the trusted platform key. In this embodiment, management backend 155 may generate a trusted platform key for each information handling system 100 based on platform attributes, platform keys 200, and an injected platform signing key.

In one embodiment, management backend 155 may determine one or more characteristics, or "partition attributes," associated with each partition 230 in computing environment 170 as part of a partition validation process. For example, management backend 155 may identify partition attributes such as an operating system type (e.g., Windows, Linux, Ubuntu, and the like) and/or a boot loader type associated with partitions 230-1 through 230-6 within information handling systems 100-1 through 100-3. In one embodiment, trusted boot engine 125 may generate a partition identifier (e.g., GUID, UUID, and the like) for each partition 230 within a device 150 communicably coupled to information handling system 100. For example, a trusted boot engine 125 (not shown in figure) of information handling system 100-1 shown in FIG. 2 may generate a partition identifier for partition 230-1 and a partition identifier for partition 230-2 of device 150-1 communicably coupled to information handling system 100-1. In this example, trusted boot engine 125 may store the partition identifiers in memory 105-1 of information handling system 100-1 (i.e., partition identifiers 210-1 shown in FIG. 2).

In one embodiment, management backend 155 may access partition identifiers 210 stored in memory 105 of information handling system 100 to determine the partition attributes. For example, management backend 155 may access partition identifiers 210-1 stored in memory 105-1 of information handling system 100-1 and may determine partition attributes associated with partitions 230-1 and 230-2 based on the partition identifiers 210-1. In this example, partition attributes may indicate an operating system type for operating systems 240-1 and 240-2 and a boot loader type associated with operating systems 240-1 and 240-2 stored in partitions 230-1 and 230-2, respectively. In another embodiment, management backend 155 may use partition identifiers 210 stored in memory 105 of information handling system 100 to access partitions 230 of devices 150 and determine the partition attributes. For example, management backend 155 may access partition identifiers 210-2 stored in memory 105-2 of information handling system 100-2 and may access partitions 230-3 and 230-4 of device 150-2 to determine partition attributes associated with partitions 230-3 and 230-4. In this example, partition attributes may indicate an operating system type for operating systems 240-3 and 240-4 stored in partitions 230-3 and 230-4, respectively.

In one embodiment, management backend 155 may generate storage root keys for partitions 230 of devices 150. In particular, management backend 155 may generate a storage root key for each partition 230 based on partition attributes associated with the partition 230 and the trusted platform key associated with the information handling system 100 to which the partition 230 is communicably coupled. In one embodiment, management backend 155 may generate a boot loader key based on the partition identifier 210, the operating system 240 type, the and boot loader type (i.e., partition attributes) associated with a partition 230. In this embodiment, the boot loader key may be or include a smart hash used, in part, to generate a storage root key for partitions 230 of devices 150. In the embodiment illustrated in FIG. 2, management backend 155 may use the partition attributes associated with partitions 230 and the trusted platform keys associated with information handling systems 100 to generate storage root keys for partitions 230 of devices 150. For example, management backend 155 may determine partition attributes associated with partition 230-5 of device 150-3 based on operating system 240-5 type and boot loader type and may use the partition attributes and trusted platform key associated with information handling system 100-3 to generate a storage root key for partition 230-5.

In one embodiment, management backend 155 may generate trusted boot signatures 250 for partitions 230 of devices 150. Specifically, management backend 155 may generate a trusted boot signature 250 for each partition 230 based on the storage root key associated with the partition 230 and the trusted platform key associated with the information handling system 100 to which the partition 230 is communicably coupled. In the embodiment illustrated in FIG. 2, management backend 155 may use the storage root keys associated with partitions 230 and the trusted platform keys associated with information handling systems 100 to generate trusted boot signatures 250 for partitions 230 of devices 150. Once generated, management backend 155 may store trusted boot signatures 250 in partitions 230 of devices 150 to validate the partitions 230. As described above with respect to FIG. 1, trusted boot engine 125 may identify trusted boot signatures 250 stored in partitions 230 of devices 150 communicably coupled to information handling system 100 during a booting process of information handling system 100. Because partitions 230 have already been validated (i.e., as indicated by trusted boot signatures 250 stored therein), devices 150 may be easily swapped, or communicably coupled to a series of different information handling systems 100 and/or networks, throughout computing environment 170 without requiring a user to perform an initial boot of each operating system 240 before the boot manager, device 150, and/or operating system 240 are/is electronically presented to a user within a list of devices.

FIG. 3 is a flowchart depicting selected elements of an embodiment of a method for validating a partition of a device communicably coupled to an information handling system in a computing environment. It is noted that certain operations described in method 300 may be optional or may be rearranged in different embodiments.

Method 300 may begin at step 310, where a management backend of the computing environment may determine platform attributes associated with the information handling system. For example, management backend 155 may identify platform attributes such as a model type and/or manufacturer associated with information handling systems 100 as described above with respect to FIG. 2. In step 320, the management backend may identify a platform key associated with the information handling system. For example, management backend 155 may identify a platform key 200 associated with each information handling system 100 as described above with respect to FIG. 2. In step 330, the management backend may generate a trusted platform key for the information handling system based on the platform attributes and the platform key. For example, management backend 155 may generate a trusted platform key for each information handling system 100 based on the platform attributes and the platform key 200 as described above with respect to FIG. 2. In step 340, the management backend may determine partition attributes associated with the partition of the device. For example, management backend 155 may identify partition attributes such as an operating system type (e.g., Windows, Linux, Ubuntu, and the like) and/or a boot loader type associated with partitions 230-1 through 230-6 within information handling systems 100-1 through 100-3 as described above with respect to FIG. 2. In step 350, the management backend may generate a storage root key for the partition of the device based on the partition attributes and the trusted platform key. For example, management backend 155 may generate a storage root key for each partition 230 based on partition attributes associated with the partition 230 and the trusted platform key associated with the information handling system 100 to which the partition 230 is communicably coupled as described above with respect to FIG. 2. In step 360, the management backend may generate a trusted boot signature for the partition of the device based on the trusted platform key and the storage root key. For example, management backend 155 may generate a trusted boot signature 250 for each partition 230 based on the storage root key associated with the partition 230 and the trusted platform key associated with the information handling system 100 to which the partition 230 is communicably coupled as described above with respect to FIG. 2. In step 370, the management backend may store the trusted boot signature in the partition of the device to validate the partition. For example, management backend 155 may store trusted boot signatures 250 in partitions 230 of devices 150 to validate the partitions 230 as described above with respect to FIG. 2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for validating a partition of a device communicably coupled to an information handling system in a computing environment, the method comprising:
    determining, by a management backend of the computing environment, platform attributes associated with the information handling system;
    identifying, by the management backend, a platform key associated with the information handling system;
    generating, by the management backend, a trusted platform key for the information handling system based on the platform attributes and the platform key;
    determining, by the management backend, partition attributes associated with the partition of the device;
    generating, by the management backend, a storage root key for the partition of the device based on the partition attributes and the trusted platform key;
    generating, by the management backend, a trusted boot signature for the partition of the device based on the trusted platform key and the storage root key; and
    storing, by the management backend, the trusted boot signature in the partition of the device to validate the partition.

2. The method of claim 1, further comprising:
    during a booting phase of the information handling system:
        accessing, by a trusted boot engine of the information handling system, a device path stored in a memory of the information handling system, the device path associated with a plurality of devices in the computing environment, each of the plurality of devices including one or more partitions, each of the one or more partitions storing an operating system;
        identifying, by the trusted boot engine, the partition of the device communicably coupled to the information handling system based on a partition identifier;
        identifying, by the trusted boot engine, the trusted boot signature stored in the partition;
        decoding, by the trusted boot engine, the device path to generate a list of devices enumerating each of the plurality of devices in the computing environment; and
        adding, by the trusted boot engine, the device communicably coupled to the information handling system to the list of devices.

3. The method of claim 2, further comprising:
    identifying, by the trusted boot engine, an additional device communicably coupled to the information handling system, the additional device including an additional partition;
    identifying, by the trusted boot engine, that the additional partition does not include an additional trusted boot signature stored in the additional partition; and
    excluding, by the trusted boot engine, the additional device communicably coupled to the information handling system from the list of devices.

4. The method of claim 2, further comprising:
electronically presenting, by the trusted boot engine, the list of devices to a user of the information handling system via a display of the information handling system;
receiving, by the trusted boot engine, a selection from the user indicating a selected operating system stored in a selected partition of a selected device of the plurality of devices enumerated in the list of devices; and
causing, by the trusted boot engine, a boot loader stored in the selected partition of the selected device to boot the selected operating system stored in the selected partition for the user.

5. The method of claim 2, wherein each operating system stored in the one or more partitions of each of the plurality of devices is associated with a priority, the priority based on a boot history associated with the operating system.

6. The method of claim 1, wherein determining the platform attributes associated with the information handling system comprises:
identifying, by the management backend, a model type associated with the information handling system; and
identifying, by the management backend, a manufacturer associated with the information handling system.

7. The method of claim 1, wherein determining the partition attributes associated with the partition of the device comprises:
generating, by a trusted boot engine of the information handling system, a partition identifier for the partition of the device;
storing, by the trusted boot engine, the partition identifier in a memory of the information handling system;
accessing, by the management backend, the partition identifier in the memory of the information handling system;
identifying, by the management backend, an operating system type based on the partition identifier, the operating system stored in the partition of the device; and
identifying, by the management backend, a boot loader type based on the partition identifier, the boot loader stored in the partition of the device.

8. One or more computer-readable non-transitory storage media embodying software that is operable when executed to:
determine, by a management backend of a computing environment, platform attributes associated with an information handling system of the computing environment;
identify, by the management backend, a platform key associated with the information handling system;
generate, by the management backend, a trusted platform key for the information handling system based on the platform attributes and the platform key;
determine, by the management backend, partition attributes associated with a partition of a device communicably coupled to the information handling system;
generate, by the management backend, a storage root key for the partition of the device based on the partition attributes and the trusted platform key;
generate, by the management backend, a trusted boot signature for the partition of the device based on the trusted platform key and the storage root key; and
store, by the management backend, the trusted boot signature in the partition of the device to validate the partition.

9. The media of claim 8, wherein the software is further operable when executed to:
access, by a trusted boot engine of the information handling system, a device path stored in a memory of the information handling system, the device path associated with a plurality of devices in the computing environment, each of the plurality of devices including one or more partitions, each of the one or more partitions storing an operating system;
identify, by the trusted boot engine, the partition of the device communicably coupled to the information handling system based on a partition identifier;
identify, by the trusted boot engine, the trusted boot signature stored in the partition;
decode, by the trusted boot engine, the device path to generate a list of devices enumerating each of the plurality of devices in the computing environment; and
add, by the trusted boot engine, the device communicably coupled to the information handling system to the list of devices.

10. The media of claim 9, wherein the software is further operable when executed to:
identify, by the trusted boot engine, an additional device communicably coupled to the information handling system, the additional device including an additional partition;
identify, by the trusted boot engine, that the additional partition does not include an additional trusted boot signature stored in the additional partition; and
exclude, by the trusted boot engine, the additional device communicably coupled to the information handling system from the list of devices.

11. The media of claim 9, wherein the software is further operable when executed to:
electronically present, by the trusted boot engine, the list of devices to a user of the information handling system via a display of the information handling system;
receive, by the trusted boot engine, a selection from the user indicating a selected operating system stored in a selected partition of a selected device of the plurality of devices enumerated in the list of devices; and
cause, by the trusted boot engine, a boot loader stored in the selected partition of the selected device to boot the selected operating system stored in the selected partition for the user.

12. The media of claim 9, wherein each operating system stored in the one or more partitions of each of the plurality of devices is associated with a priority, the priority based on a boot history associated with the operating system.

13. The media of claim 8, wherein to determine the platform attributes associated with the information handling system, the software is further operable when executed to:
identify, by the management backend, a model type associated with the information handling system; and
identify, by the management backend, a manufacturer associated with the information handling system.

14. The media of claim 8, wherein to determine the partition attributes associated with the partition of the device, the software is further operable when executed to:
generate, by a trusted boot engine of the information handling system, a partition identifier for the partition of the device;
store, by the trusted boot engine, the partition identifier in a memory of the information handling system;
access, by the management backend, the partition identifier in the memory of the information handling system;
identify, by the management backend, an operating system type based on the partition identifier, the operating system stored in the partition of the device; and identify, by the management backend, a boot loader type based on the partition identifier, the boot loader stored in the partition of the device.

15. A computing environment, comprising:
an information handling system including one or more processors; and
one or more computer-readable non-transitory storage media coupled to one or more of the processors and comprising instructions operable when executed by one or more of the processors to cause the system to:
determine, by a management backend of the computing environment, platform attributes associated with the information handling system;
identify, by the management backend, a platform key associated with the information handling system;
generate, by the management backend, a trusted platform key for the information handling system based on the platform attributes and the platform key;
determine, by the management backend, partition attributes associated with a partition of a device communicably coupled to the information handling system;
generate, by the management backend, a storage root key for the partition of the device based on the partition attributes and the trusted platform key;
generate, by the management backend, a trusted boot signature for the partition of the device based on the trusted platform key and the storage root key; and
store, by the management backend, the trusted boot signature in the partition of the device to validate the partition.

16. The computing environment of claim 15, wherein the processors are further operable when executed to:
access, by a trusted boot engine of the information handling system, a device path stored in a memory of the information handling system, the device path associated with a plurality of devices in the computing environment, each of the plurality of devices including one or more partitions, each of the one or more partitions storing an operating system;
identify, by the trusted boot engine, the partition of the device communicably coupled to the information handling system based on a partition identifier;
identify, by the trusted boot engine, the trusted boot signature stored in the partition;
decode, by the trusted boot engine, the device path to generate a list of devices enumerating each of the plurality of devices in the computing environment; and
add, by the trusted boot engine, the device communicably coupled to the information handling system to the list of devices.

17. The computing environment of claim 16, wherein the processors are further operable when executed to:
identify, by the trusted boot engine, an additional device communicably coupled to the information handling system, the additional device including an additional partition;
identify, by the trusted boot engine, that the additional partition does not include an additional trusted boot signature stored in the additional partition; and
exclude, by the trusted boot engine, the additional device communicably coupled to the information handling system from the list of devices.

18. The computing environment of claim 16, wherein the processors are further operable when executed to:
electronically present, by the trusted boot engine, the list of devices to a user of the information handling system via a display of the information handling system;
receive, by the trusted boot engine, a selection from the user indicating a selected operating system stored in a selected partition of a selected device of the plurality of devices enumerated in the list of devices; and
cause, by the trusted boot engine, a boot loader stored in the selected partition of the selected device to boot the selected operating system stored in the selected partition for the user.

19. The computing environment of claim 16, wherein each operating system stored in the one or more partitions of each of the plurality of devices is associated with a priority, the priority based on a boot history associated with the operating system.

20. The computing environment of claim 15, wherein to determine the partition attributes associated with the partition of the device, the processors are further operable when executed to:
generate, by a trusted boot engine of the information handling system, a partition identifier for the partition of the device;
store, by the trusted boot engine, the partition identifier in a memory of the information handling system;
access, by the management backend, the partition identifier in the memory of the information handling system;
identify, by the management backend, an operating system type based on the partition identifier, the operating system stored in the partition of the device; and
identify, by the management backend, a boot loader type based on the partition identifier, the boot loader stored in the partition of the device.

* * * * *